Sept. 12, 1961 A. I. STIEBEL 2,999,921
ELECTRONICALLY CONTROLLED WORKING PROCESSES
Filed Sept. 10, 1958 3 Sheets-Sheet 1

INVENTOR.
ARIEL I. STIEBEL
BY
Strauch, Nolan + Neale
ATTORNEYS

2,999,921
ELECTRONICALLY CONTROLLED WORKING PROCESSES
Ariel I. Stiebel, Detroit, Mich., assignor to Rockwell-Standard Corporation, Coraopolis, Pa., a corporation of Pennsylvania
Filed Sept. 10, 1958, Ser. No. 760,169
9 Claims. (Cl. 219—7.5)

The present invention relates to methods and systems for controlling work processes by inducing magnetic pulses on work material to control further operations thereon.

It has been known and practiced heretofore to control many types of machine tools electrically or electronically to perform various work operations on materials without manual assistance by the operator by such means as prepunched cards or tape, prerecorded magnetic tape or wire in which case the stored signals are transmitted by way of a play-back or sensing head or photoelectric cell from the prerecorded records to control the machine. One disadvantage of the prior methods lies in the fact that the cards, tape, or wires had to be prerecorded in the sequence of the operations to be performed and therefore each different work set-up required a different prerecorded record. Another disadvantage is that two separate electric systems are required, first: the inducing device to record signals on the tape or wire corresponding to the type of operations to be performed, second: the sensing head or play-back to transmit the recorded signals to control operation of the machine.

The present invention eliminates the disadvantages incorporated in the use of such intermediary systems by inducing signals such for example as magnetic pulses, directly onto the material to be worked on by passing through an electronic circuit element forming an integral part of the machine. The magnetic pulses induced on the material to be worked are sensed and respectively converted by electronic units during the travel of the magnetizable material through the machine and are transmitted to influence the mechanical components of the machine to perform the desired operations in the desired sequence and at the appropriate time.

It has been found that the novel electronic control system of the present invention can be used advantageously for many applications requiring a series of machine operations constituting a process on steel materials such as wire, strip, sheet, rods, and the like with the resulting accuracy superior to that of prior systems and at the same time requiring inexpensive control equipment. For the purpose of explaining the operation of the invention, it will be described with two illustrative operations as related to wire working, namely electronically controlling heating of wire for increasing its torsional proportional limit and electronically controlling cutting of the wire into predetermined lengths, although it is obvious to those skilled in this art that the present invention in its broader aspects is of general applicability.

A major object of the present invention is to provide a novel method and system for controlling subsequent operations of a machine in the course of processing work materials such for example as wire, strips, sheets, rods, and the like by inducing magnetic control signals directly on the materials being worked. Where the materials have magnetic properties, the magnetic control signals are simply induced in the material itself. In non-magnetic work materials magnetized markings may be applied on the work material.

Another object of the present invention is the provision of novel electronic means to induce magnetic signals at a first fixed station on moving materials to be worked on and to control further machine operations at a second fixed station from said induced magnetic signals.

Specifically an important object of the present invention is the provision of a novel system to electronically control the automatic cut-off of wire in predetermined lengths by means of induced and recorded magnetic pulses carried by the wire to be cut.

A further object of the present invention is the provision of an electronic circuit composed of a pulse inducing unit, a sensing or pickup head coupled with a frequency sensitive circuit to induce and detect magnetic pulses on magnetizable materials to be worked on and control the subsequent machine operations thereof.

A still further object of the present invention is the provision of a wire speed controlled high frequency induction heating unit for relieving stress concentrations in said moving wire whereby the current is controlled as a function of the wire speed.

Other objects and novel features will become evident from the claims and from the following description and appended drawings in which:

FIGURE 3 is a circuit diagram of the frequency converter and induction heater control circuit of FIGURE 2;

Figure 1:
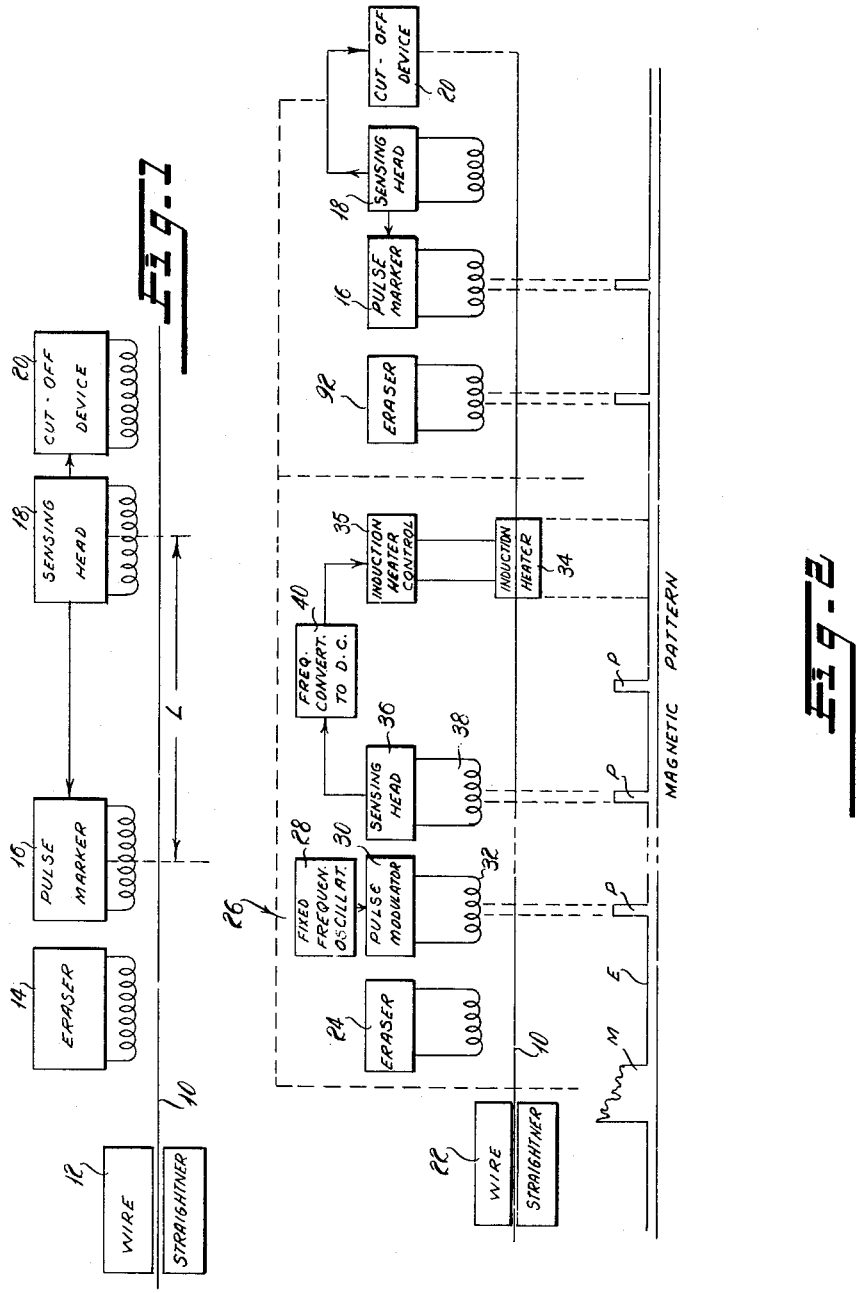
FIGURE 1 is a schematic diagram of a system embodying my invention for cutting wire of a magnetizable material into predetermined lengths.

Referring now to the drawings there is illustrated in FIGURE 1 a wire working process embodying the present invention. In the system illustrated in FIGURE 1, a steel wire 10 having a gauge size as for example No. 9, is unrolled from large spools (not shown) and passed through wire straightener 12 to be eventually cut into straight wire strips of a uniform length L.

As wire 10 comes out of wire straightener 12, there is frequently some initial non-uniform magnetism which is preferably removed as by use of a conventional erasing unit 14. Erasing unit 14 applies an alternating high frequency field of sufficient magnitude to provide an over-all uniform magnetic field. This field may be created by passing a high frequency current of sufficient magnitude through a transformer having its laminations cut open to provide two poles.

Wire 10 then passes through a stationary magnetic pulse marker station 16 to induce a sharp magnetic pulse or spike in wire 10. Such a pulse may be supplied by any convenient pulse generating circuit to cause a pulse of current to flow through a suitable recording head which may have a construction generally similar to that used in erase head unit 14.

Spaced a distance L along wire 10 from pulse marker station 16 is a magnetic sensing head 18 which is connected to produce a current pulse as the magnetic pulse induced on wire 10 passes head 18. This current pulse is used to control operation of wire cut-off device 20 which may energize a solenoid or the like to actuate a cutter blade to cut the wire, and to activate or trigger pulse marker 16 to again induce a further magnetic pulse on wire 10. Pulse marker 16 may therefore comprise a conventional bistable device such for example as a single shot multivibrator which is triggered by the signal received from sensing head 18.

The system of FIGURE 1 is capable of operating with widely varying wire speeds since the only essential requirement is that there be sufficient relative velocity between sensing head 18 and wire 10 to produce an electrical signal of adequate amplitude to control the cut-off device 20 and pulse marker 16. Since the wire speed is ordinarily in excess of 5 inches per second with conventional wire straighteners, adequate signal strength is easily achieved.

In wire manufacturing for uses where the mechanical strength of the wire is important such for example in the manufacture of seat springs for automobiles, the processing of the wire to produce a condition that will promote a substantial increase in the torsional proportional limits of the wire is highly desirable. During the cold working process of the wire inherent in the unreeling and straightening of the wire, only the outer fibers receive a substantial amount of cold work. It is apparent therefore, that a heat treating process which preferentially affects those outer fibers only will be of great advantage in restoring to the wire its initial strength and constitute a considerable improvement in processing wire of this type. It has been found that induction heating of steel wire can be so controlled with sufficient precision that just the outer fibers of the wire are heat treated.

Various actual experiments have been performed and the results at two illustrative wire speeds are given below to show the effects obtained by applying different temperatures to different wire speeds. The torsional proportional limit of the wire as here defined is the point at which permanent set takes place upon the application of successively greater loads. A test specimen of a certain size and cross-section had a limit of 66,700 p.s.i. when not stress relieved. Two wires of the same size were run at speeds of 9 in./sec. and at 20 in./sec. through the induction heating unit, and different temperatures applied producing the following tabulated results:

| Temperature in Degrees F | Wire Velocity 9 in./sec., p.s.i. | Wire Velocity 20 in./sec., p.s.i. |
| --- | --- | --- |
| 700 | 88,900 | |
| 750–800 | 92,000 | |
| 800–900 | 90,200 | 74,100 |
| 900–1,000 | 87,100 | 88,000 |
| 1,000–1,100 | | 96,600 |
| 1,100–1,200 | 73,100 | |

An optimum torsional proportional limit of 92,000 p.s.i. at a temperature of 750°–800° F. for the 9 in./sec. wire and of 96,600 p.s.i. at a temperature of 1000–1100° for the 20 in./sec. wire provides a considerable improvement over the 66,700 p.s.i. limit for straightened wire which is not subsequently heat treated.

The preceding table in terms of temperature and wire velocity shows that the heat which has to be applied to the wire to obtain the maximum torsional proportional limit is critical in the sense that if either too little or too much heat is applied, the torsional proportional limit falls off sharply from a maximum value. Since there is inherently a variation of wire speed in apparatus of the type here involved, to provide heating which results in a temperature of the wire during the heat treating process for optimizing the torsional proportional limit requires the heat produced by the heating unit to be a function of the instantaneous wire velocity. In other words, as the wire velocity increases, the current in the induction heating unit must also increase, and vice versa, in order to maintain the maximum torsional proportional limit throughout the wire.

In accordance with the present invention, the current passing through an induction heating coil is controlled by any one of several conventional methods including electronic filament current control of the induction heating unit, parallel loads selectively varied in the output of the induction heating unit, or by a three-phase network. All of the foregoing conventional current controlling methods may in turn be controlled by a suitable varying D.C. voltage applied to the induction heating unit in such way that variations in wire speed produce a voltage which in turn decreases or increases the heat producing current.

Figure 2:
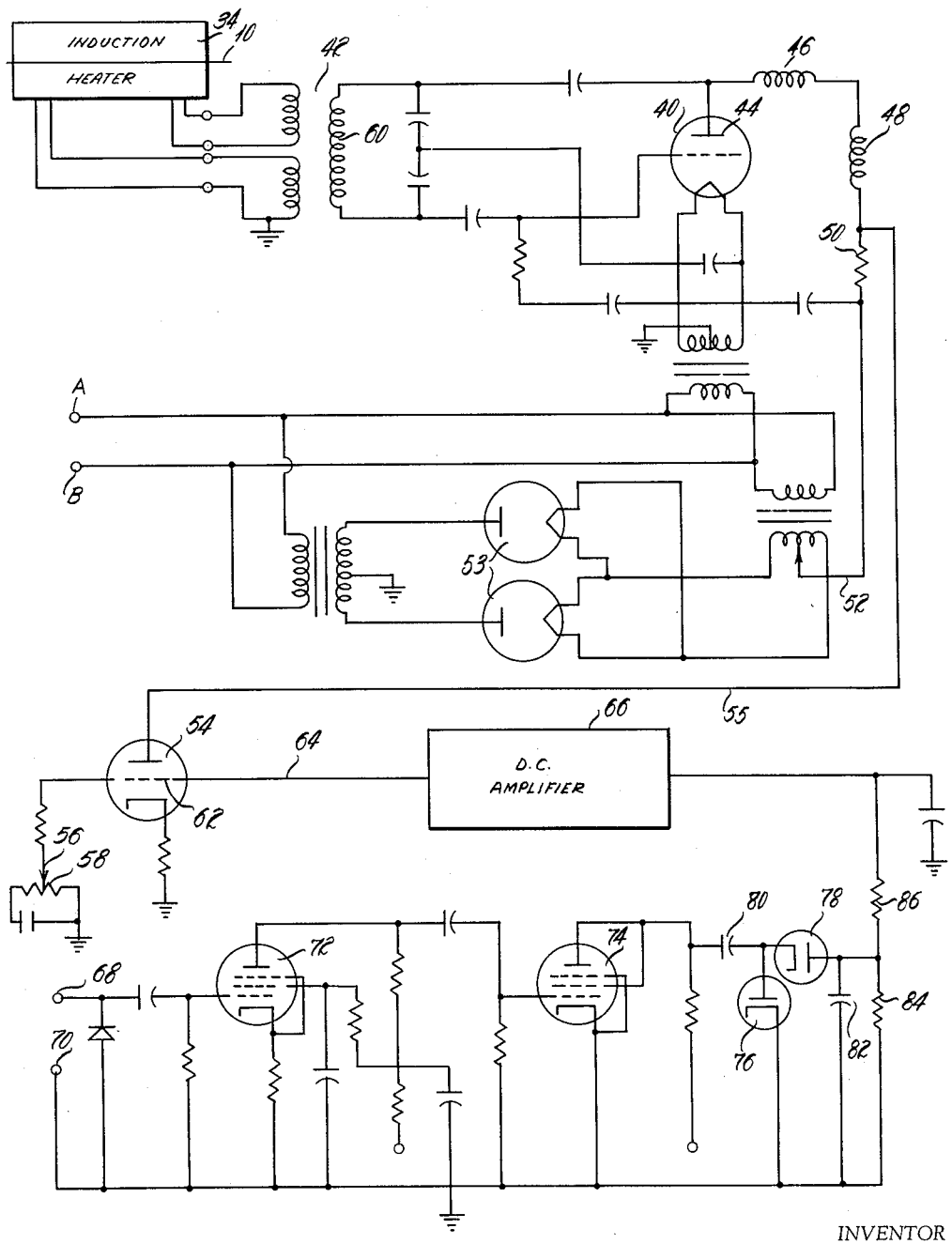
FIGURE 2 is a schematic diagram of the system of FIGURE 1 modified to include a stage of heat treating the wire after straightening and prior to cutting.

With reference now to FIGURE 2, it is to be assumed that the wire 10 coming out of a conventional wire straightener 22 at a certain predetermined average speed possesses some residual magnetism M which is removed by erase unit 24. A series of pulses P are next applied to wire 10 to be spaced uniformly along the wire at a pulse marker station 26 which comprises a fixed frequency oscillator 28 and pulse modulator 30 connected to recording head 32. Spaced along wire 10 in the direction of wire travel at a position immediately adjacent induction heater station 34 is a sensing head 36 including a sensing coil 38.

The magnetized areas or pulses P on wire 10 are sensed by coil 38 of the sensing unit 36 which produces an electric current pulsating at a frequency which is dependent upon the instantaneous velocity of wire 10 or, in other words, frequency or number of pulses passing in one second through sensing coil 38.

This frequency, which may be of the order of 9000 c.p.s., is passed into a frequency converter 40 which produces an output D.C. voltage that is proportional to the frequency input of the sensing head 36. The directly measured frequency will result in reference D.C. output voltage if wire speed is equal to a reference value, or create a varying D.C. potential according to wire speed variations from induction heater control 35 which then is applied to control the heat producing current in the induction heating unit 34 so as to provide a stress-relieved wire in which maximum torsional proportional limits have been substantially increased.

A diagram of a typical circuit operating as a frequency converter is shown in FIGURE 3. Wire 10 is shown passing through induction heater 34 which is controlled by a conventional oscillator circuit of the Colpitts type comprising triode 40 and output transformer 42. Power is supplied to plate 44 of tube 40 through inductances 46 and 48 and resistor 50 from lead 52 connected to a conventional power supply containing conventional full wave rectifier tubes 53 energized from alternating current supplied through terminals A and B.

Control tube 54 also receives plate voltage from lead 52 through resistor 50 and lead 55. By adjusting arm 56 on potentiometer 58 in the grid circuit of tube 54, current conduction through tube 54 will vary and a variable voltage drop across plate load resistor 50 will result. Changing the plate voltage on oscillator tube 40 causes a corresponding change in the magnitude of the current flowing into tank coil 60 of transformer 42 to thereby control the heat supplied to wire 10 by induction heating unit 34.

The bias on grid 62 for control tube 54 is also controlled by the voltage on lead 64 which is connected to the output of D.C. amplifier 66. The output pulses from sensing head 36 (see FIGURE 2) are connected to terminals 68 and 70 of clipper tube 72. The received pulses are rectified, clipped and shaped by tube 72 and the resulting square wave is differentiated and applied to limiter tube 74. The combination of diodes 76 and 78 and of capacitors 80 and 82 comprises a conventional frequency to voltage converter whereby the D.C. voltage output appearing across capacitor 82 and resistor 84 is directly proportional to the repetition rate or frequency of the pulses applied to terminals 68 and 70. A negative voltage appears at the junction between capacitor 82 and resistor 84 and is applied through resistor 86 to D.C. amplifier 66, and after sufficient amplification, this voltage is applied through lead 64 to grid 62 of control tube 54.

The desired amount of heat treatment with a reference wire speed set by the operator is provided by the adjustment of arm 56 on potentiometer 58. If wire 10 moves faster to momentarily increase the frequency of pulses received at terminals 68 and 70, the negative voltage output across capacitor 82 and resistor 84 will increase thereby causing grid 62 to become more negative. Current conduction through tube 54 then decreases thus increasing the plate voltage on oscillator tube 40 with the result that more heat will be instantaneously supplied by induction heating coil, which is necessary to provide the necessary annealing heat for the wire now moving at a greater speed. With decreasing wire speed, the reverse action takes place and less heat is supplied.

Figure 4:
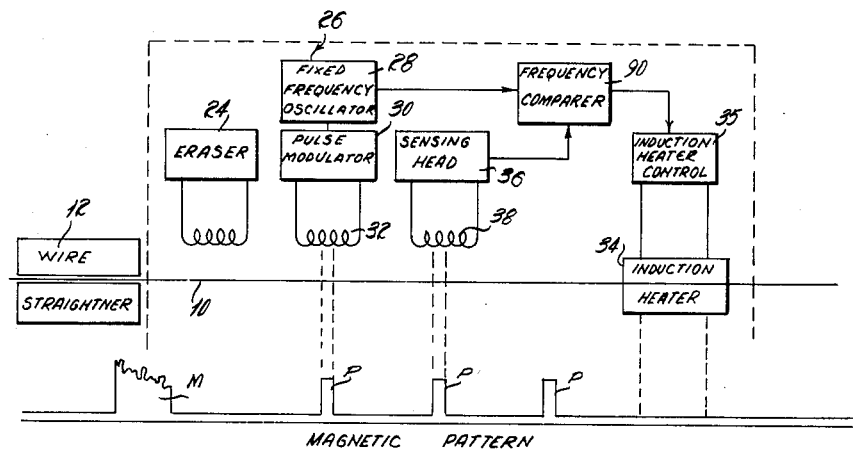
FIGURE 4 is a modification of the system of FIGURE 2 also embodying the present invention.

An alternative method of converting the magnetic pulse frequency to control the amount of heat of the heating unit 22 is shown in FIGURE 4. The frequency in this instance is passed from the sensing head 36 into a frequency comparer 90 which compares the frequency with the original frequency of the oscillator 28 of the pulse inducing unit 26. Frequency comparer circuits are well known in the art and further description is therefore believed unnecessary.

Figure 5:
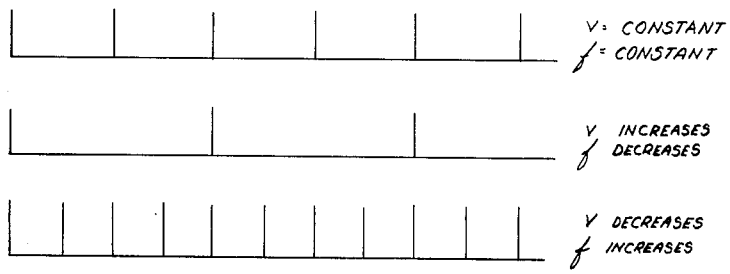
FIGURE 5 is a pattern diagram of induced magnetic pulses on wire moving at different speeds.

With reference to the magnetic pattern diagram of FIGURE 5, it will occur that if the wire 10 travels at a constant speed, the frequency sensed by head 36 and the original frequency of oscillator 26 will be the same and the resulting D.C. output of the comparer 90 in this instance is zero. If however the wire is subjected to acceleration or deceleration, the frequency sensed by the sensing head is higher or lower due to an increase or decrease respectively in the number of pulses per unit length of wire sensed per second, and a certain difference in frequency will result in comparer unit 90 which then will produce a D.C. potential, the amplitude being proportional to the frequency difference and the polarity depending upon whether the sensing head frequency is higher or lower than the applied frequency.

Thus it will be seen that variations in the velocity of wire 10 produce a D.C. potential which varies both in amplitude and in polarity and which then can be used to regulate the heat producing current for the induction heater 34. The produced D.C. voltage of the frequency converter 40 of FIGURES 2 and 3 or frequency comparer 90 of FIGURE 4 is applied to an induction heater control unit 35 located in the high frequency induction heating unit 34. Control unit 35 controls the amount of current flowing into the heating coil of induction heater 34, thereby regulating the amount of heat to be applied according to the wire speed variations.

By the aforedescribed method of regulating the amount of current flowing into the induction heating coil for stress relieving a wire it has been advantageously achieved to control the heat so precisely and automatically that only the outer fibers of the wire which inherently receive the greatest amount of cold work during the straightening process are heated initially.

Wire 10 after having been exposed to the stress relieving heat usually will have lost all previous magnetic pulse marking by leaving the induction heating unit 34. If, however, some irregular magnetic markings remain on the wire, these may be removed by passing the wire again through an erasing unit 92 of FGURE 2 similar to erasing unit 14 described above in connection with FIGURE 1 to eliminate all magnetic traces.

Wire 10 then passes through a fixed magnetic pulse marker 16 which induces an initial single pulse in form of a magnetic marking on the wire. Pulse marker 16 is coupled to a fixed sensing head 18, similar to sensing head 18 of FIGURE 1, which is spaced from pulse marker 16 at a distance equal to exactly the length into which the wire should be cut as explained in connection with FIGURE 1. The first initial magnetic marking induced by marker 16 on wire 10 is sensed by the sensing head 8 as the wire passes along which transforms the magnetic pulse into an electrical control signal; this control signal is immediately applied to the pulse marker 16 activating the marker to induce another magnetic marking on the passing wire and so on continuously until the wire stops.

At the same time the same electrical control signal from the sensing head 18 is passed along to a control unit of a cut-off device 20 which may energize a solenoid or the like to actuate a cutter blade to cut the wire at the desired wire length. Cut-off device 20 is preferably of the type having one or more cutting blades which move with the wire travel so that the cut-off operation is performed without stopping the wire to interfere with the heat treating process.

It is apparent from the foregoing that the activating of the pulse marker 16 with signals from sensing head 18 makes the cut-off operation entirely independent of the velocity of the traveling wire, the length of the cut-off pieces being predetermined and dependent wholly on the spacing between the pulse marker 16 and sensing head 18.

A simple electronic oscillator, recording, and controlling system in accordance with the present invention makes it possible to control subsequent machine operations with the advantage of reducing the cost of mass-produced steel material parts. The present invention as related to wire working processes is of great advantage over all previous machine operation controlling means and possesses features which enable it to be applied to a variety of other material working processes.

The invention may be embodied in other specific forms without departing from the spirit or essential characteristics thereof. In some machine operations where the work piece is of a non-magnetic material such as aluminum, copper, brass or the like, a magnetic marking material such as an ink or paint composed of magnetizable particles suspended in a suitable carrier or adhesive may be applied directly to the work piece and the present invention will be useful with non-magnetizable work materials.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of controlling predetermined processes including a cutting operation on work pieces in a machine controlled work piece processing system comprising providing selectively magnetized portions on a de-magnetized magnetizable work piece which are in the processing system to serve as control signals for processing said work piece, sensing said magnetized portions on the work piece at stations adapted to perform process operations on said work piece, and controlling the process at the station where the magnetized portions are sensed by the nature of the control signals in said magnetized portions.

2. A method for cutting wire into predetermined lengths comprising the steps of moving a de-magnetized magnetizable wire along a predetermined path, providing selectively magnetized spots on the wire at a first fixed station along said path, sensing the wire for magnetized spots at a second fixed station along said path for simultaneously controlling operation of a wire cutting device to cut the wire in lengths corresponding to the distance between said stations and for causing a second spot to be magnetized on the wire at said first station.

3. In combination with apparatus for straightening wire made of magnetizable material and means for cutting the straightened wire into pieces of a predetermined length, an electronic pulse generator having a recording head operatively positioned adjacent said wire at a position between said straightening apparatus and said cutting means for inducing on the wire a magnetized region, a read-out head adjacent said wire at a position between said recording head and said cutting means and responsive to magnetized regions on said wire, a first circuit means for connecting output signals from said read-out head to control operation of said wire cutting means for cutting the wire in lengths corresponding to the distance between said heads without interrupting the movement of said wire and a second circuit means for connecting output signals from said read-out head to control operation of said recording head to induce on the wire additional magnetic regions.

4. A method of controlling a plurality of predetermined processes on work pieces in a machine controlled work piece processing system comprising providing first selectively magnetized portions on a de-magnetized magnetizable work piece which are in the work processing system to serve as control signals for a first station adapted to perform a first process operation on said work piece requiring continuous movement of said work piece, sensing said magnetized portions on the work piece at a position adjacent said first station, controlling the process at said first station in accordance with the nature of the control signals in said magnetized portions, then obliterating the control signals for said first station, providing second selectively magnetized portions on the same work piece at a position between said first station and a second station to serve as control signals for said second station, sensing the second magnetized portions on the work piece at a location adjacent said second station, and controlling the process at said second station in accordance with the nature of the control signals in the magnetized portions approaching said second station without interrupting movement of said work piece through said first station.

5. In a plural-station processing system for sequentially stress-relieving and cutting a continuous wire of magnetizable material wherein wire velocity is variable, the method of controlling operation of at least one of said stations without interrupting movement of the wire comprising selectively magnetizing portions of a de-magnetized magnetizable wire at a position along the wire in front of said one station, and sensing the wire for magnetized portions at a position adjacent said one station to control the process operation at said one station.

6. In a plural-station processing system for sequentially straightening, then stress-relieving and cutting a continuous wire of magnetizable material wherein wire velocity is variable and containing induction heating means at a station along said wire intermediate a wire straightening station and a wire cutting station, the method of controlling operation of said induction heating station comprising selectively magnetizing portions of a de-magnetized magnetizable wire at a position along the wire between the wire straightening station and the induction heating station, sensing the wire for magnetized portions at a position adjacent said induction heating station to control the heat produced in said induction heating station in accordance with the instantaneous wire velocity passing through the induction heating station, obliterating the magnetization on said wire at a position between said induction heating station and said cutting means, then selectively magnetizing spots on the wire at a first fixed station along said wire between the induction heating station and the wire cutting station, sensing the wire for magnetized spots at a second fixed station along said wire for simultaneously controlling operation of a wire cutting device for cutting said wire in equal lengths independently of the velocity thereof without interrupting the movement of said wire through said induction heating station and for causing a second spot to be magnetized on the wire at said first fixed station.

7. Electronically controlled work process apparatus comprising: means for inducing magnetic pulses of constant frequency on a continuously moving de-magnetized, magnetizable work piece having a variable velocity, the number of said pulses in a unit length of the work piece being a function of the velocity of said work piece; a sensing coil along the moving route of said work piece, said sensing coil being adapted to pick up pulsating current by means of said magnetic pulses when said work piece passes by said sensing coil, the pulsating current having a certain frequency dependent upon the velocity of said work piece; a frequency converter in conjunction with said sensing coil provided to measure the variable input frequency of said sensing coil against a fixed reference frequency, the difference between said variable input frequencies and said reference frequency creating a varying signal voltage output which is proportional to the variation of said velocity of said work piece; an induction heating unit in conjunction with said frequency converter and adapted to heat-treat said work piece, said varying signal voltage being applied to said induction heating unit to subsequently precisely regulate the amplitude of the current to said induction heating unit whereby uniform heat treatment of only the outer fibers of said work piece is obtained even though the work piece moves at a variable velocity.

8. In combination with apparatus for straightening and then cutting the straightened wire into pieces of predetermined length, means including an induction heater located in the path of the wire between the wire straightening and wire cutting apparatus, and control means for regulating the heat supplied by said induction heater in response to the instantaneous and varying velocity of the wire as it passes through said heater to preferentially treat outer fibers of said wire by a uniform amount regardless of the instantaneous varying velocity of the wire, said control means comprising means for inducing magnetized regions on said wire, means positioned adjacent said induction heater for sensing the magnetized regions, and means connected to the output of said sensing means for regulating the heat supplied by said induction heater.

9. Electronically controlled work piece process apparatus for cutting a strip type work piece into predetermined lengths comprising: means for inducing magnetizable spots on a continuously moving de-magnetized, magnetizable work piece, said magnetizable spots being spaced at predetermined uniform distances comprising a sensing coil and a recording head mounted along said work piece at a distance equal to said predetermined distance, and electronic circuit means responsive to a signal output from said sensing coil for energizing said recording coil; a work piece cut off member for severing said work piece into segments of equal predetermined lengths without causing the interruption of movement of said work piece; said sensing coil being mounted along said work piece at a position adjacent said work piece cut off member; and circuit means responsive to said signal output from said sensing coil for also actuating said work piece cut off member for severing said work piece into equal segments irrespective of variations of velocity of said work piece.

References Cited in the file of this patent
UNITED STATES PATENTS

| | | |
|---|---|---|
| 2,343,887 | Crane et al. | Mar. 14, 1944 |
| 2,427,485 | Wilson | Sept. 16, 1947 |
| 2,437,776 | Wilson | Mar. 16, 1948 |
| 2,628,539 | Neergaard | Feb. 17, 1953 |
| 2,797,753 | Bornemann | July 2, 1957 |
| 2,813,186 | Bock | Nov. 12, 1957 |
| 2,819,369 | Dexter | Jan. 7, 1958 |
| 2,829,229 | Metz | Apr. 1, 1958 |